(12) United States Patent
Jolly

(10) Patent No.: US 8,382,028 B2
(45) Date of Patent: Feb. 26, 2013

(54) ROTARY WING AIRCRAFT ROTATING MACHINERY VIBRATION CONTROL SYSTEM

(75) Inventor: Mark R. Jolly, Raleigh, NC (US)

(73) Assignee: Lord Corporation, Cary, NC (US)

( * ) Notice: Subject to any disclaimer, the term of this patent is extended or adjusted under 35 U.S.C. 154(b) by 1055 days.

(21) Appl. No.: 11/757,002

(22) Filed: Jun. 1, 2007

(65) Prior Publication Data

US 2010/0012768 A1    Jan. 21, 2010

Related U.S. Application Data

(60) Provisional application No. 60/809,916, filed on Jun. 1, 2006.

(51) Int. Cl.
*B64C 11/00* (2006.01)
*B64C 27/54* (2006.01)

(52) U.S. Cl. .................... 244/17.13; 244/76 R

(58) Field of Classification Search .............. 700/19, 700/28; 701/3; 416/500; 244/17.11, 17.13, 244/75.1, 76 R
See application file for complete search history.

(56) References Cited

U.S. PATENT DOCUMENTS

| | | | |
|---|---|---|---|
| 5,005,439 A | 4/1991 | Jensen et al. | |
| 5,347,884 A * | 9/1994 | Garnjost et al. | 74/570.2 |
| 5,825,663 A * | 10/1998 | Barba et al. | 702/41 |
| 5,903,077 A * | 5/1999 | Garnjost et al. | 310/81 |
| 6,105,685 A * | 8/2000 | Bald | 173/49 |
| 6,212,445 B1 * | 4/2001 | Barba et al. | 700/280 |
| 6,345,546 B1 * | 2/2002 | Houze | 74/61 |
| 7,132,817 B2 * | 11/2006 | Noe | 322/29 |
| 7,448,854 B2 * | 11/2008 | Jolly et al. | 416/1 |
| 7,919,945 B2 * | 4/2011 | Houston et al. | 318/460 |
| 2004/0050999 A1 * | 3/2004 | Hill et al. | 244/17.27 |
| 2006/0083617 A1 | 4/2006 | Jolly et al. | |
| 2006/0135302 A1 | 6/2006 | Manfredotti et al. | |
| 2007/0156289 A1 | 7/2007 | Altieri et al. | |

FOREIGN PATENT DOCUMENTS

| | | |
|---|---|---|
| DE | 4407748 A1 | 10/1994 |
| EP | 0337040 A | 10/1999 |
| FR | 2852648 A | 9/2004 |

OTHER PUBLICATIONS

European Patent Office Patent Cooperation Treaty, Written Opinion Search Report, PCT/US2007/070229, Jun. 25, 2008.

* cited by examiner

*Primary Examiner* — Philip J Bonzell
(74) *Attorney, Agent, or Firm* — Richard G. Miller

(57) ABSTRACT

Helicopters and rotary wing aircraft vibration control system for controlling rotating machinery vibrations are provided for rotating machinery vibrations correlating with operational rotating frequencies. The vibration control system includes a first imbalance rotor with a first mass concentration, the first imbalance rotor driven to rotate with a first controllable phase, a second imbalance rotor with a second mass concentration, the second imbalance rotor driven to rotate with a second controllable phase, a third imbalance rotor with a third mass concentration, the third imbalance rotor driven to rotate with a third controllable phase, a fourth imbalance rotor with a fourth mass concentration, the fourth imbalance rotor driven to rotate with a fourth controllable phase. The vibration control system includes vibration sensors for monitoring the vibration and outputting vibration signals. The vibration control system includes a controller, the controller receiving an operational rotating frequency reference signal, the controller also receiving the vibration sensor signals with the controller controlling the first imbalance rotor first controllable phase, the second imbalance rotor second controllable phase, the third imbalance rotor third controllable phase, and the fourth imbalance rotor fourth controllable phase relative to the rotating frequency reference signal to produce a biaxial force which reduces the vibration signals outputted from the vibration sensors.

5 Claims, 5 Drawing Sheets

ROTARY WING AIRCRAFT ROTATING MACHINERY VIBRATION CONTROL SYSTEM

CROSS REFERENCE

This application claims the benefit of, and incorporates by reference, U.S. Provisional Patent Application No. 60/809,916 filed on Jun. 1, 2006 with the United States Patent and Trademark Office.

FIELD OF THE INVENTION

The present invention relates to rotary wing aircraft vibration control systems. More particularly the invention relates to helicopter vibration control systems with rotating masses.

BACKGROUND OF THE INVENTION

There is a need for an effective and light-weight means for controlling helicopter vibrations. There is a need for light-weight helicopter vibration control systems with rotating masses. There is a need for light-weight helicopter vibration control systems with actuators that can create biaxial or planar forces. There is a need for a robust system for controlling vibration control rotating masses to create planar forces used in controlling helicopter vibrations.

SUMMARY

The invention includes a rotary wing rotating machinery aircraft, having an aircraft body interior cabin space supported in flight by a rotary wing system rotating with an operational rotating frequency, the rotary wing aircraft having a persistent operational rotating frequency vibration, the rotary wing aircraft including an operational rotating frequency reference sensor, the reference sensor outputting a reference signal indicative of the rotary wing system operational rotating frequency, a first imbalance rotor having a first mass concentration, the first imbalance rotor driven to rotate at a frequency substantially equal to the operational rotating frequency and with a first controllable phase, a second imbalance rotor having a second mass concentration, the second imbalance rotor driven to rotate with a second controllable phase at a frequency substantially equal to the operational rotating frequency and, a third imbalance rotor having a third mass concentration, the third imbalance rotor driven to rotate at a frequency substantially equal to the operational rotating frequency and with a third controllable phase, a fourth imbalance rotor having a fourth mass concentration, the fourth imbalance rotor driven to rotate with a fourth controllable phase at a frequency substantially equal to the operational rotating frequency and, a system controller, the controller receiving the outputted reference signal and also receiving vibration sensor signals wherein the controller independently controls the first imbalance rotor first controllable phase, the second imbalance rotor second controllable phase, the third imbalance rotor third controllable phase, and the fourth imbalance rotor fourth controllable phase relative to the rotating frequency reference signal to produce a first biaxial force and a moment which reduces the vibration as measured by the vibration sensors. Preferably the persistent vibration that is being controlled and minimized correlates with the operational rotating frequency, preferably with the rotating frequency being monitored by the reference sensor. Preferably the phasing of these first, second, third and fourth imbalance rotors is controlled with respect to the reference signal to produce a controllable resultant force that is biaxial and preferably planar.

The invention includes a rotary wing aircraft vibration control system for controlling a rotating machinery vibration, the rotating machinery vibration correlating with an operational rotating frequency, the vibration control system including a first imbalance rotor having a first mass concentration, the first imbalance rotor driven to rotate with a first controllable phase, a second imbalance rotor having a second mass concentration, the second imbalance rotor driven to rotate with a second controllable phase, a third imbalance rotor having a third mass concentration, the third imbalance rotor driven to rotate with a third controllable phase, a fourth imbalance rotor having a fourth mass concentration, the fourth imbalance rotor driven to rotate with a fourth controllable phase, vibration sensors for monitoring the vibration and outputting vibration signals, a controller, the controller receiving an operational rotating frequency reference signal, the controller also receiving the vibration sensor signals wherein the controller controls the first imbalance rotor first controllable phase, the second imbalance rotor second controllable phase, the third imbalance rotor third controllable phase, and the fourth imbalance rotor fourth controllable phase relative to the rotating frequency reference signal to produce a biaxial force which reduces the vibration signals outputted from the vibration sensors.

The invention includes a vehicular vibration control system for controlling a vibration in a vehicle, the vehicular vibration control system including a first imbalance rotor having a first mass concentration, the first imbalance rotor driven to rotate with a first controllable phase, a second imbalance rotor having a second mass concentration, the second imbalance rotor driven to rotate with a second controllable phase, a third imbalance rotor having a third mass concentration, the third imbalance rotor driven to rotate with a third controllable phase, a fourth imbalance rotor having a fourth mass concentration, the fourth imbalance rotor driven to rotate with a fourth controllable phase, at least a first vibration sensor, the at least first vibration sensor for monitoring the vehicle vibration, the at least one vibration sensor monitors the vibration and outputs a first vibration signal, a system controller, the controller receiving the first vibration signal from the at least first vibration sensor wherein the controller controls the first imbalance rotor first controllable phase, the second imbalance rotor second controllable phase, the third imbalance rotor third controllable phase, and the fourth imbalance rotor fourth controllable phase to produce a first biaxial force which reduces the vehicle vibration monitored by the at least one vibration sensor.

The invention includes a rotating machinery vibration control system for controlling a rotating machinery vibration in a machine having a rotating member rotating with an operational rotating frequency, the vibration control system including a first imbalance rotor having a first mass concentration, the first imbalance rotor driven to rotate with a first controllable phase, a second imbalance rotor having a second mass concentration, the second imbalance rotor driven to rotate with a second controllable phase, a third imbalance rotor having a third mass concentration, the third imbalance rotor driven to rotate with a third controllable phase, a fourth imbalance rotor having a fourth mass concentration, the fourth imbalance rotor driven to rotate with a fourth controllable phase, a plurality of vibration sensors for monitoring the vibration and outputting vibration signals, a controller, the controller receiving an operational rotating frequency reference signal, the controller also receiving the vibration sensor signals wherein the controller controls the first imbalance rotor first controllable phase, the second imbalance rotor second controllable phase, the third imbalance rotor third controllable phase, and the fourth imbalance rotor fourth controllable phase relative to the rotating frequency reference signal to produce a biaxial force which reduces the vibration signals outputted from the vibration sensors.

The invention includes a rotary wing aircraft having an aircraft body interior cabin space supported in flight by a rotary wing system rotating in exterior air space with an operational rotating frequency, the rotary wing aircraft having a persistent operational rotating frequency vibration, the rotary wing aircraft including an aircraft body structure between the exterior and body interior cabin space and the rotary wing system rotating with the operational rotating frequency, a rotary wing aircraft rotating machinery vibration control system, the rotary wing aircraft rotating machinery vibration control system including a controller, the controller receiving an outputted rotating frequency signal and a plurality of outputted vibration sensor signals, at least a first vibration control system actuator, at least a second vibration control system actuator, the first vibration control system actuator mounted to the aircraft body structure at a first vibration control system actuator mounting location, the second vibration control system actuator mounted to the aircraft body structure at a second vibration control system actuator mounting location, the second vibration control system actuator mounting location distal from the first vibration control system actuator mounting location, wherein the controller controls the at least first vibration control system actuator and the at least second vibration control system actuator, relative to the rotating frequency reference signal to reduce the received outputted vibration sensor signals.

It is to be understood that both the foregoing general description and the following detailed description are exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principals and operation of the invention.

DETAILED DESCRIPTION OF THE PREFERRED EMBODIMENTS

Figure 1:
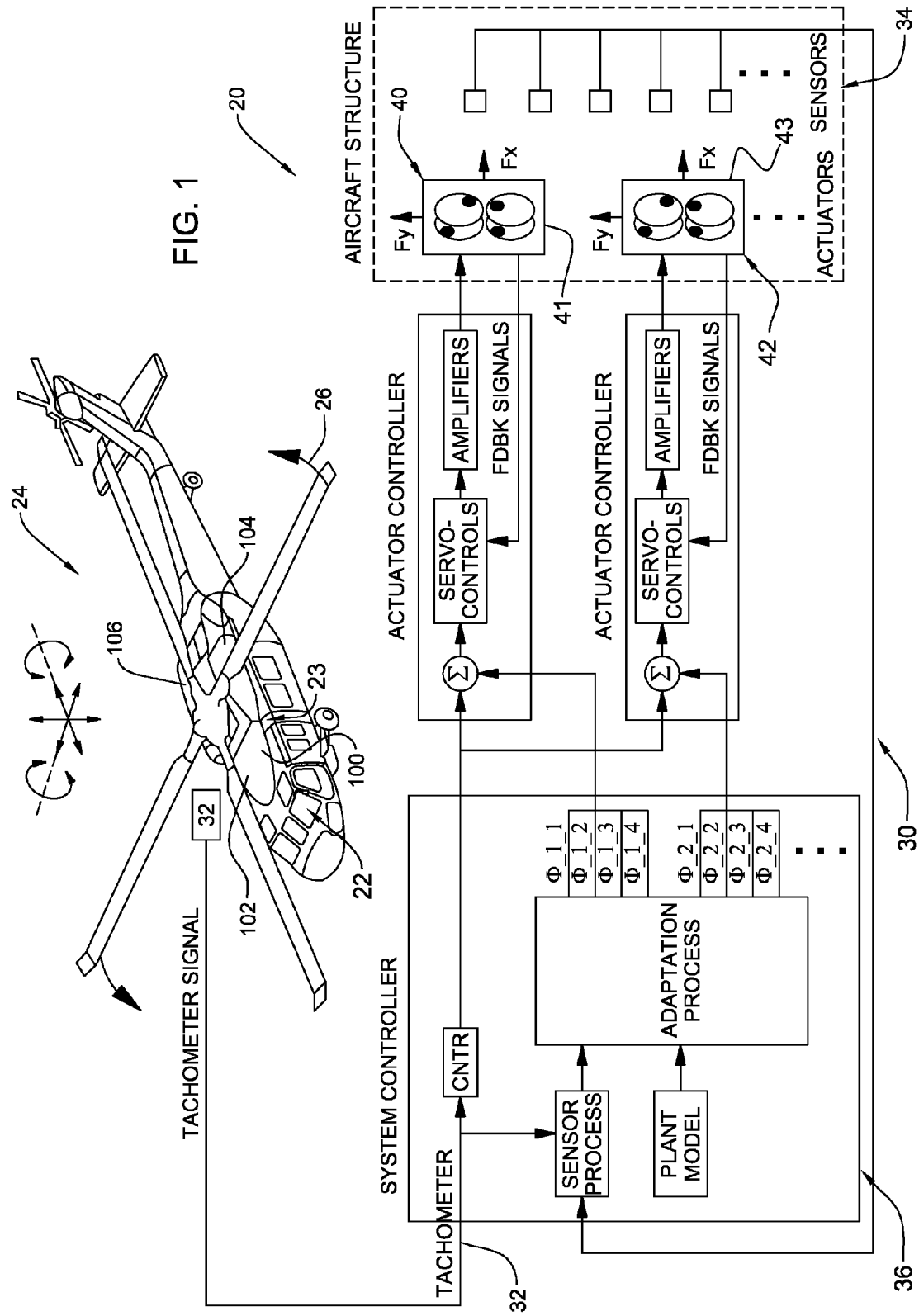
FIG. 1 shows a view of helicopter vibration control system.
Figure 2A:
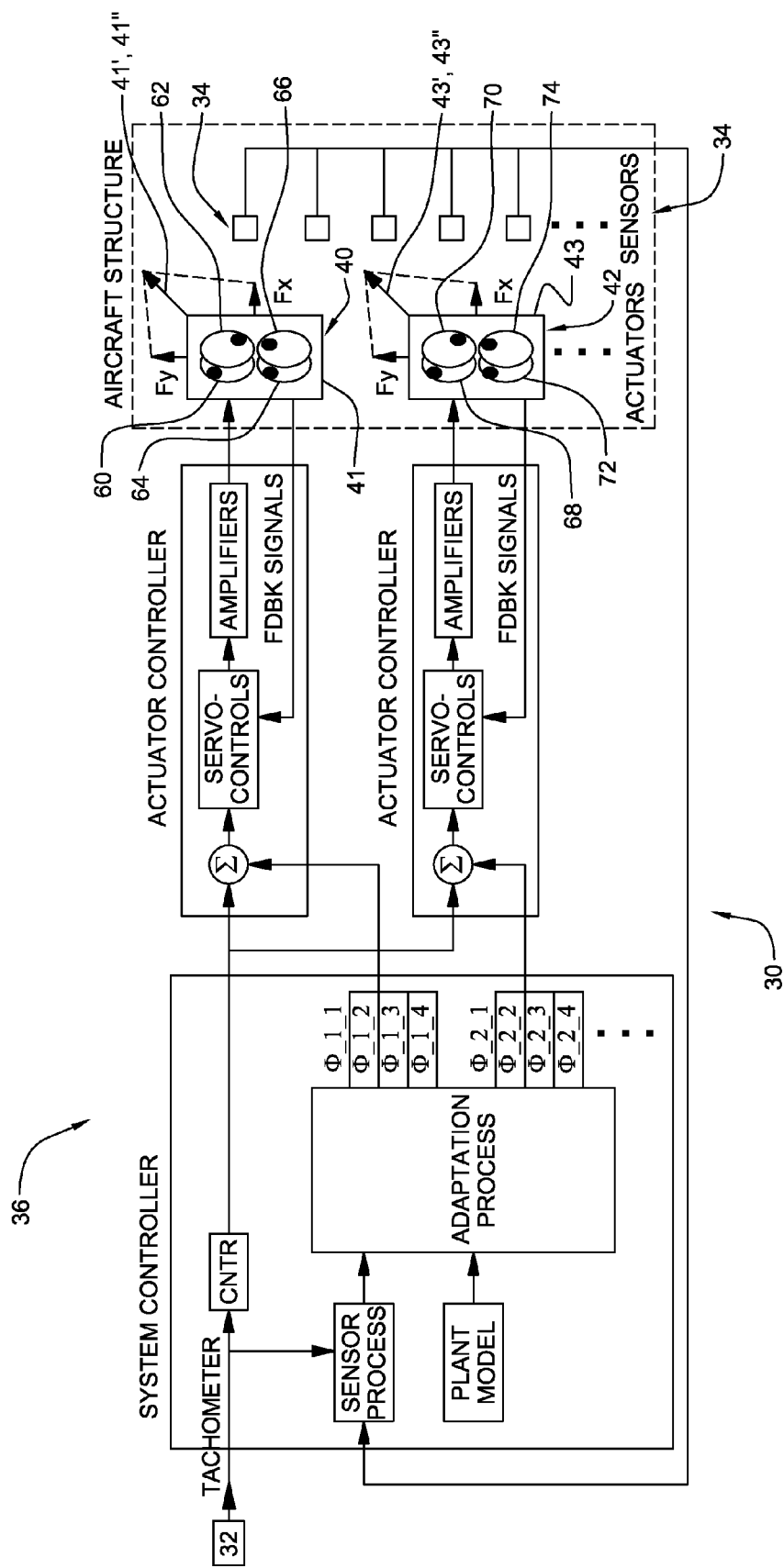
FIG. 2A-B show a vibration control system for creating planar x y forces $F_x$ and $F_y$.
Figure 2B:
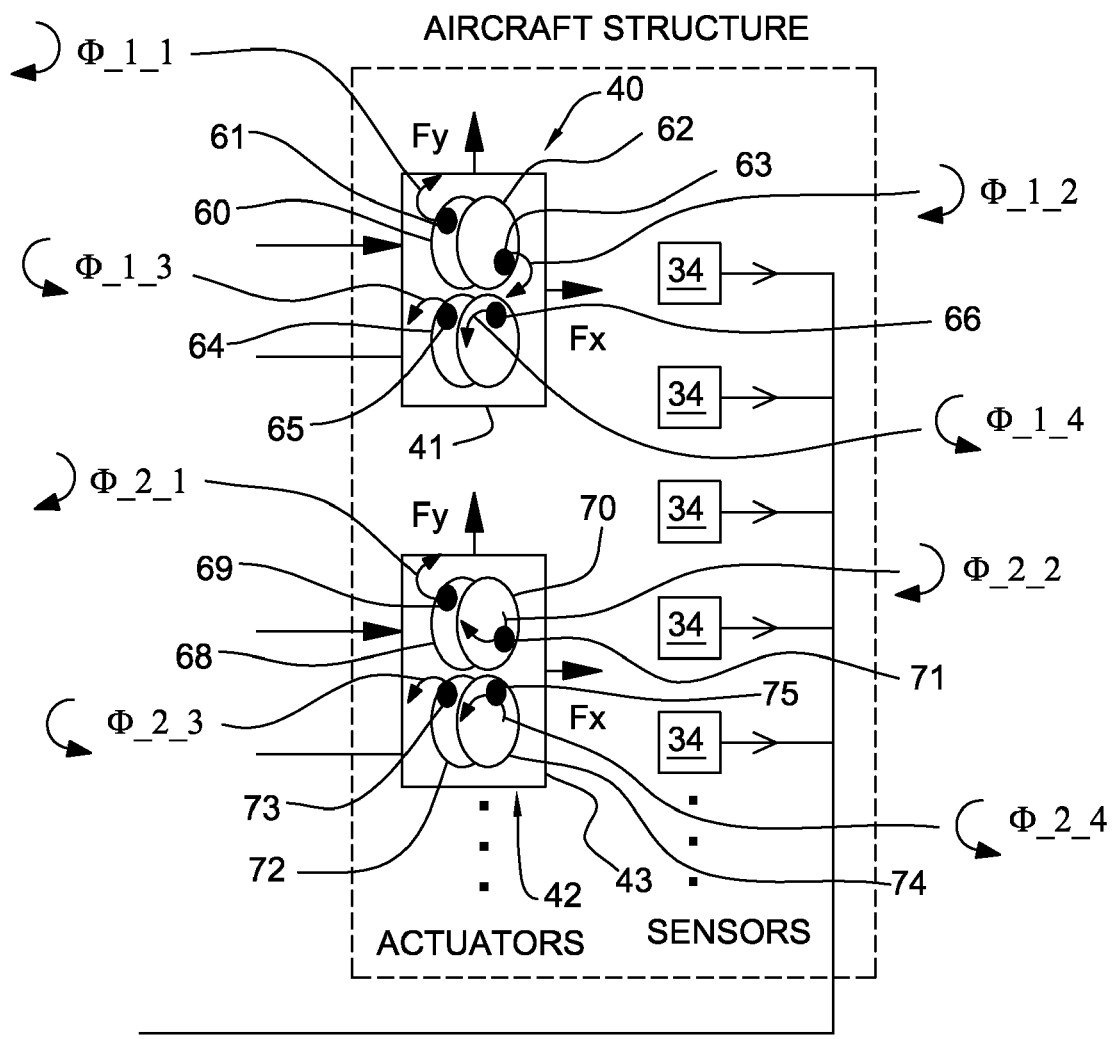
Figure 3:
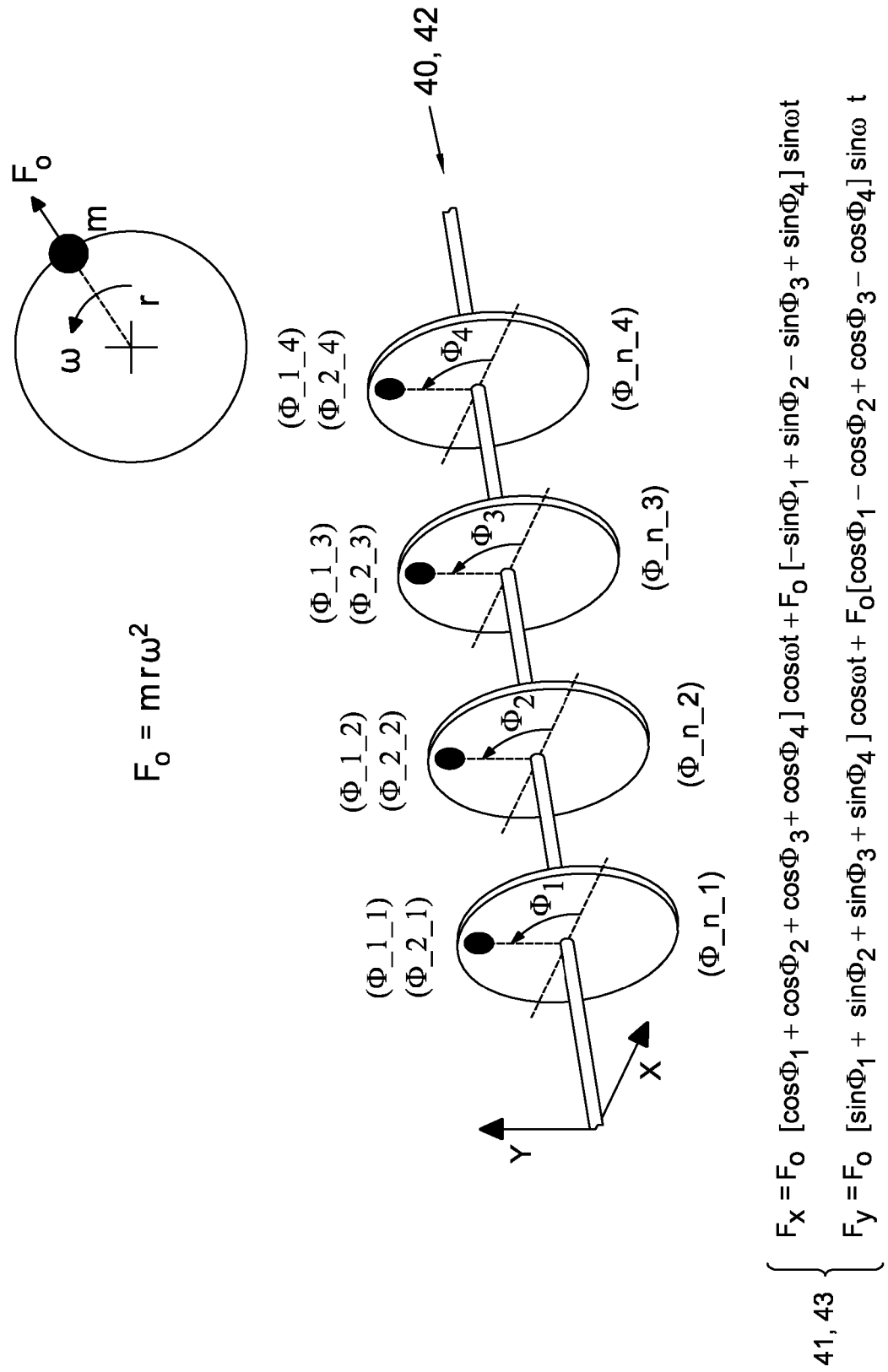
FIG. 3 illustrates a method for creating arbitrary biaxial forces in the x and y directions ($F_x$ and $F_y$) with four rotating imbalanced rotors $F_x=F_o[\cos(\phi\_n\_1)+\cos(\phi\_n\_2)+\cos(\phi\_n\_3)+\cos(\phi\_n\_4)]\cos \omega t+F_o[-\sin(\phi\_n\_1)+\sin(\phi\_n\_2)-\sin(\phi\_n\_3)+\sin(\phi\_n\_4)]\sin \omega t$ $F_y=F_o[\sin(\phi\_n\_1)+\sin(\phi\_n\_2)+\sin(\phi\_n\_3)+\sin(\phi\_n\_4)]\cos \omega t+F_o[\cos(\phi\_n\_1)-\cos(\phi\_n\_2)+\cos(\phi\_n\_3)-\cos(\phi\_n\_4)]\sin \omega t).$
Figure 4:
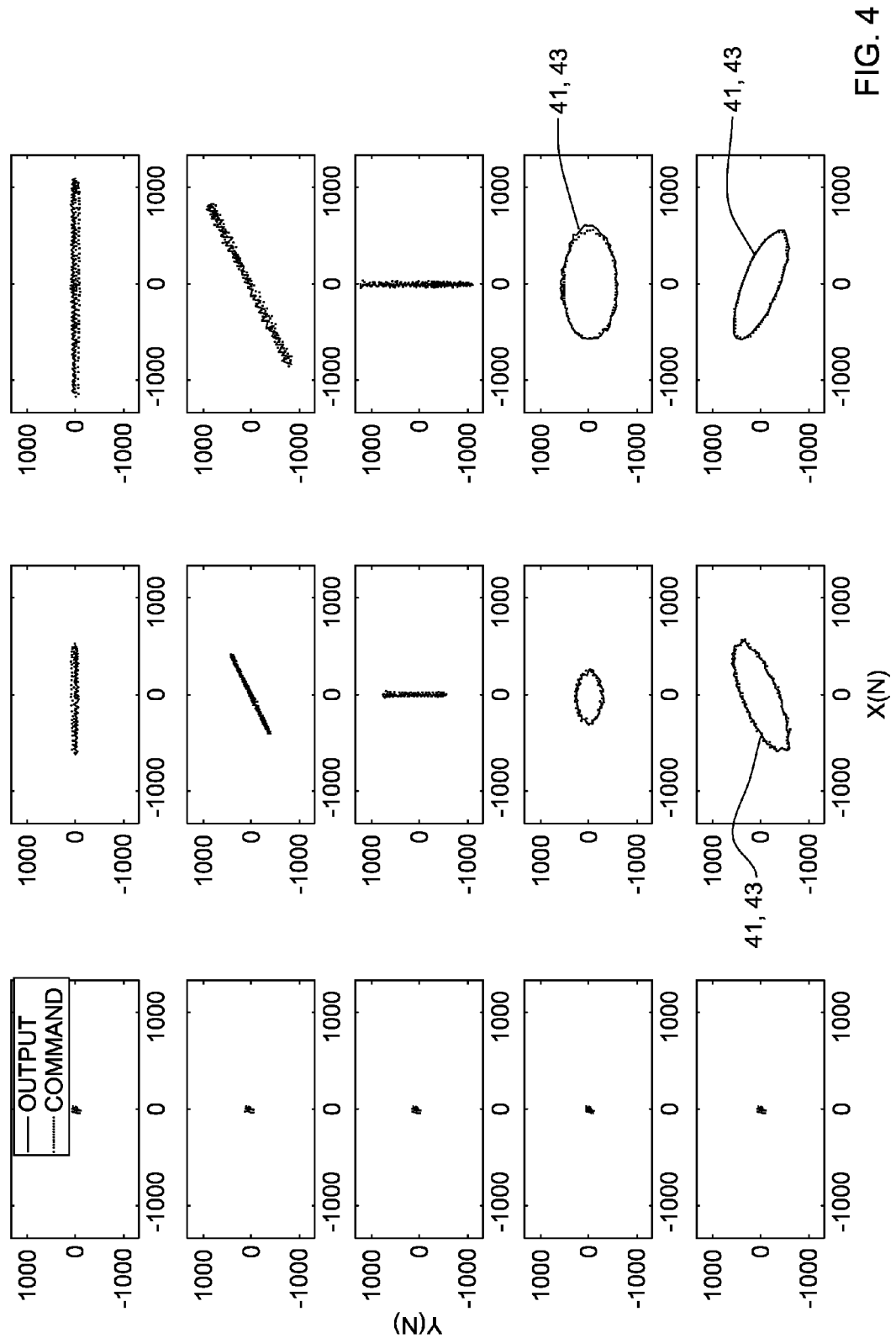
FIG. 4 illustrates biaxial forces $F_x$ and $F_y$ outputted in the x y plane.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

Reference will now be made in detail to the present preferred embodiments of the invention, examples of which are illustrated in the accompanying drawings.

The invention includes a rotary wing rotating machinery aircraft 20. The rotary wing aircraft 20 having an aircraft body interior cabin space 22 supported in flight by a rotary wing system 24 rotating with an operational rotating frequency 26, the rotary wing aircraft having a persistent operational rotating frequency vibration. The persistent operational rotating frequency vibration preferably correlates with the vehicular operating frequency or a harmonic thereof (N/rev). The rotary wing aircraft includes a rotary wing aircraft rotating machinery vibration control system 30. The rotary wing aircraft includes a persistent operational rotating frequency reference tachometer sensor 32 the operational rotating frequency reference sensor outputting a rotating frequency signal indicative of the rotary wing system operational rotating frequency.

The rotary wing aircraft vibration control system preferably includes at least a first vibration control system actuator 40 and at least a second vibration control system actuator 42. The rotary wing aircraft vibration control system includes a plurality of imbalance rotors, with each imbalance rotor having a mass concentration, preferably with the imbalance rotors substantially equal in terms of dimensions, size, shape, and the rotor mass concentration. The at least first vibration control system actuator 40 is comprised of imbalance rotors 60, 62, 64, 66. The first imbalance rotor 60 has a first mass concentration 61, the first imbalance rotor 60 is driven to rotate with a first controllable phase ($\phi\_1\_1$). The first imbalance rotor mass concentration 61 is electromagnetically motor driven at a first rotational clockwise rotational direction to rotate with the first controllable phase ($\phi\_1\_1$) with the controllable phase with respect to the tachometer rotating frequency signal 32. The second imbalance rotor 62 has a second mass concentration 63, the second imbalance rotor 62 driven to rotate with a second controllable phase ($\phi\_1\_2$). The second imbalance rotor mass concentration 63 is electromagnetically motor driven at a second rotational clockwise rotational direction to rotate with the second controllable phase ($\phi\_1\_2$). The third imbalance rotor 64 has a third mass concentration 65, the third imbalance rotor driven to rotate with a third controllable phase ($\phi\_1\_3$), with the imbalance mass concentration electromagnetically motor driven at a third rotational counter clockwise rotational direction. The fourth imbalance rotor 66 has a fourth mass concentration 67, the fourth imbalance rotor driven to rotate with a fourth controllable phase ($\phi\_1\_4$), with the imbalance mass concentration electromagnetically motor driven at a fourth rotational counter clockwise rotational direction. The rotary wing aircraft vibration control system includes a plurality of vibration sensors 34 for monitoring the vibration and outputting vibration signals, preferably the vibration sensors are accelerometers, and preferably sense vibration in at least two axis, preferably three axis direction accelerometers. The rotary wing aircraft vibration control system includes a system controller 36, the controller 36 receiving the outputted rotating frequency signal from the operational rotating frequency reference sensor 32, the controller 36 also receiving the vibration sensor signals from the sensors 34 wherein the controller 36 independently controls the first imbalance rotor first controllable phase ($\phi\_1\_1$), the second imbalance rotor second controllable phase ($\phi\_1\_2$), the third imbalance rotor third controllable phase ($\phi\_1\_3$), and the fourth imbalance rotor fourth controllable phase ($\phi\_1\_4$) relative to the rotating frequency reference signal to produce a first biaxial force 41' and preferably at least a first moment 41" which reduces the vibration signals outputted from the vibration sensors 34. Preferably the first controlled phase, second controlled phase, third controlled phase, fourth controlled phase are independently controlled in that the phases are not in a fixed phase relationship, with each of the four phases can be independently controlled and different from another of the four phases as compared with the phases of at least two being in a fixed phase relationship such as geared or connected together with a connecting belt restraint. Preferably the at least first vibration control actuator 40 produces the biaxial force phasor 41' and the first moment 41" which is outputted into the rotary wing aircraft physical structure to which the actuator 40 is mounted and fixed to and which combine with the persistent rotating machinery vibration and are sensed by at least one of the sensors 34, with the system controller 36 controlling the controllable phases of the imbalance rotor mass concentrations with the resulting biaxial force and moment reducing the vibration being sensed by the sensors 34.

Preferably the aircraft 20 includes at least two rotor set actuators 40 and 42, producing at least two biaxial force phasors 41 and 43 having planar elliptical profiles, preferably with the rotary wing aircraft vibration control system producing multiply planar elliptical profile forces in the aircraft structure machinery space. Preferably the at least two biaxial forces 41 and 43 are planar, and preferably produced with planar elliptical profiles with the first force phasor elliptical profile 41 oriented in a different plane relative to the second force phasor elliptical profile 43. Preferably the phases ($\phi\_n\_1$), ($\phi\_n\_2$), ($\phi\_n\_3$), ($\phi\_n\_4$) are controlled to produce the biaxial forces defined by $F_x$ and $F_y$, preferably with $$F_x = F_o[\cos(\phi\_n\_1) + \cos(\phi\_n\_2) + \cos(\phi\_n\_3) + \cos(\phi\_n\_4)]\cos\omega t + F_o[-\sin(\phi\_n\_1) + \sin(\phi\_n\_2) - \sin(\phi\_n\_3) + \sin(\phi\_n\_4)]\sin\omega t$$

$$F_y = F_o[\sin(\phi\_n\_1) + \sin(\phi\_n\_2) + \sin(\phi\_n\_3) + \sin(\phi\_n\_4)]\cos\omega t + F_o[\cos(\phi\_n\_1) - \cos(\phi\_n\_2) + \cos(\phi\_n\_3) - \cos(\phi\_n\_4)]\sin\omega t).$$

The aircraft 20 has an aircraft body structure 23 between the body interior cabin space 22, exterior space and the rotary wing system 24 which is rotating with the operational rotating frequency, with the cabin space 22 below the upper aircraft body structure 23 with the cabin and upper structure being supported by the lift from the rotary wings during flight through air. Preferably the first actuator 40 with the imbalance rotors 60, 62, 64, 66 are mounted to the upper aircraft body structure 23 at a first actuator mounting location 100 wherein the first biaxial force 41' and the moment 41" are inputted into the rotary wing aircraft 20 through the aircraft body structure 23. Preferably the sensors 34 and actuators 40, 42 are mounted to the aircraft body structure 23 with sensors 34 sensing vibrations in the aircraft body structure 23 and biaxial forces 41,43 inputted into the aircraft body structure 23, preferably at a location distal from the rotary wing.

Preferably the aircraft and the aircraft's rotary wing vibration control system includes the at least second actuator 42 including the fifth imbalance rotor 68 having fifth mass concentration 69, the fifth imbalance rotor driven at a fifth rotational speed clockwise rotational direction to rotate with a fifth controllable phase ($\phi\_2\_1$), the sixth imbalance rotor 70 having sixth mass concentration 71 with the sixth imbalance rotor driven at a sixth rotational speed clockwise rotational direction to rotate with a sixth controllable phase ($\phi\_2\_2$), the seventh imbalance rotor 72 having seventh mass concentration 73 driven at the seventh rotational speed counterclockwise rotational direction to rotate with a seventh controllable phase ($\phi\_2\_3$), and the eighth imbalance rotor 74 having eighth mass concentration 75, the eighth imbalance rotor driven at the eighth rotational speed counterclockwise rotational direction to rotate with a eighth controllable phase ($\phi2\_4$).

The fifth imbalance rotor 68, the sixth imbalance rotor 70, the seventh imbalance rotor 72, and the eighth imbalance rotor 74 are mounted to the upper aircraft body structure 23 at a second mounting location orientation 102 relative to the first actuator mounting location 100 wherein the fifth imbalance rotor fifth controllable phase ($\phi\_2\_1$), the sixth imbalance rotor sixth controllable phase ($\phi\_2\_2$), the seventh imbalance rotor seventh controllable phase ($\phi\_2\_3$), and the eighth imbalance rotor eight controllable phase ($\phi\_2\_4$) are independently controlled relative to the rotating frequency reference signal from sensor 32 to produce second biaxial force 43' and second force moment 43" which reduces the vibration signals outputted from the vibration sensors 34.

The invention includes the rotary wing aircraft rotating machinery vibration control system for controlling the rotating machinery vibration which correlates with the operational rotating frequency of the rotary wings. The rotating machinery vibration control system 30 includes the first imbalance rotor 60 having first mass concentration 61 driven to rotate with the first controllable phase ($\phi\_1\_1$), the second imbalance rotor 62 having second mass concentration 63 driven to rotate with the second controllable phase ($\phi\_1\_2$), the third imbalance rotor 64 having third mass concentration 65 driven to rotate with the third controllable phase ($\phi\_1\_3$), and the fourth imbalance rotor 66 having fourth mass concentration 67 driven to rotate with the fourth controllable phase ($\phi\_1\_4$). The rotating machinery vibration control system 30 includes the plurality of vibration sensors 34 for monitoring the vibration and outputting vibration signals. The rotating machinery vibration control system 30 includes the system controller 36 receiving the persistent operational rotating frequency reference signal from reference tachometer sensor 32 indicative of the rotating member operational rotating frequency, and also receiving the vibration sensor signals from the sensors 34 wherein the controller independently controls the first imbalance rotor first controllable phase, the second imbalance rotor second controllable phase, the third imbalance rotor third controllable phase, and the fourth imbalance rotor fourth controllable phase relative to the rotating frequency reference signal to produce the biaxial force 41', preferably with the planar nonlinear elliptical force profile 41 which reduces the vibration signals outputted from the vibration sensors 34, preferably with the system controller controlling the actuator imbalance rotor mass concentration phases independently unfixed relative to another of the controllable phases, such as ($\phi\_n\_1$) unfixed relative to ($\phi\_n\_2$), and ($\phi\_n\_3$) unfixed to ($\phi\_n\_4$). Preferably the rotating machinery vibration control system actuator 40 produces biaxial force 41' and moment 41" which combine with the persistent rotating machinery vibration from the rotary wing operational rotating frequency in the aircraft structure during operation and are resultantly sensed by at least one of the sensors 34, preferably with the biaxial force 41' having a planar elliptical profile 41. Preferably the rotating machinery vibration control system multiply mounted distal actuators produce multiply biaxial forces 41', 43' in the machinery structure to provide a controlling force defined in three dimensions.

The invention preferably includes the vehicular vibration control system for controlling a vibration in a vehicle. Preferably the vehicular vibration control system 30 controls a targeted persistent vibration, with the targeted vibration correlating with the periodic operational rotating frequency tachometer persistent reference signal outputted by the tach reference sensor 32, preferably with the persistent vibration that correlated with the vehicular operating frequency or a harmonic thereof. The vehicular vibration control system 30 includes the first imbalance rotor 60 with the first mass concentration 61 driven to rotate with the first controllable phase ($\phi\_1\_1$), the second imbalance rotor 62 with the second mass concentration 63 driven to rotate with the second controllable phase ($\phi\_1\_2$), the third imbalance rotor 64 with the third mass concentration 65 driven to rotate with the third controllable phase ($\phi\_1\_3$), and the fourth imbalance rotor 66 with the fourth mass concentration 67 driven to rotate with the fourth controllable phase ($\phi\_1\_4$). Preferably the imbalance rotors and the mass concentrations are substantially similar and equal, with substantially equal mass, size and shape configuration, preferably comprised of substantially equal circular solid rigid rotor arc pieces. Preferably the imbalance rotors are driven at rotational speeds which are substantially equal during operation, with transient rotational speeds between the rotors different during controlled phase adjustment when the rotors relative rotation phase is being changed, with the controllable phases ($\phi\_\#\_\#$) are controlled with respect to the reference signal received from the sensor 32. The vehicular vibration control system 30 includes the plurality of sensors 34 including at least a first vibration sensor 34, the at least first vibration sensor for monitoring the vehicle vibration. The at least one vibration sensor 34 monitoring the vibration and outputting a first vibration signal, preferably with the sensor outputting the signal overtime, preferably with a continuous output, which is sampled in the controller through an analog to digital converter at a sampling time rate, then further processed in the sensor process. The vehicular vibration control system plurality of sensors 34 includes a second sensor 34 which outputs a second vibration signal. Preferably the sensor' sensed vibration signals are indicative of vibration disturbances in the vehicle including solid vibrations and sound vibrations, with the sensor outputs signals based on detected mechanical energy periodic motion transmitted in the vehicles solid and fluid particle masses, measuring periodic motion of mechanical energy of vehicle particles including solids and fluids of or in the vehicle. Preferably the sensors 34 are accelerometers, preferably which sense vibration in at least two axes, and preferably in three axis directions. The vehicular vibration control system 30 includes a system controller 36, the controller receiving the first vibration signal from the at least first vibration sensor 34 wherein the controller controls the first imbalance rotor first controllable phase, the second imbalance rotor second controllable phase, the third imbalance rotor third controllable phase, and the fourth imbalance rotor fourth controllable phase to produce first biaxial force 41' which reduces the vehicle vibration monitored by the at least one vibration sensor 34. Preferably the imbalance rotors are unnested and produce a moment 41" in addition to the biaxial force 41', preferably with their center gravities spread out on their own axis, such as with two or more rotation axes, or spread out along the length of a rotation axis. In an embodiment the imbalance rotors are oriented on the same plane with four separate rotation axis. In another embodiment, a first co-rotating pair of imbalance rotors is coaxial and a second co-rotating pair of imbalance rotors is coaxial, but not coaxial with the first pair. In an embodiment all four of the imbalance rotors are all stacked together on a single rotation axis. Preferably when the rotors are stacked with a common axis, each rotor mass concentration is spaced out along the axis, with each having its own separate rotor plane normal to the common axis, preferably with the unnested rotor moment(s) inputted into the mounted to vehicle structure 23 at its respective mount location. The system includes the at least second vibration sensor 34 with the second vibration sensor fixed to the vehicle structure distal from the first sensor 34 location. Preferably the system includes at least a third vibration sensor 34, and preferably a fourth sensor 34 in a vehicle plane different from the vehicle sensor plane defined by the first, second, third sensors 34. Preferably the system includes at least a fifth and a sixth sensor, preferably with the system having at least two times as many sensors 34 as number of vibration control actuators, such as at least four sensors 34 with the first and second actuators 40, 42. Preferably the sensors 34 are mounted to the aircraft vehicle structure and sense the product of the nontransient persistent vibration and the produced biaxial forces, preferably the nonlinear planar biaxial forces 41, 43. Preferably there are at least two times as many imbalance rotors in the system as there are vibration sensors in the system inputting into the controller 36. Preferably the vibration control system includes the at least second actuator 42 including the fifth imbalance rotor 68 having fifth mass concentration 69, the fifth imbalance rotor driven at a fifth rotational speed clockwise rotational direction to rotate with a fifth controllable phase ($\phi\_2\_1$), the sixth imbalance rotor 70 having sixth mass concentration 71 with the sixth imbalance rotor driven at a sixth rotational speed clockwise rotational direction to rotate with a sixth controllable phase ($\phi\_2\_2$), the seventh imbalance rotor 72 having seventh mass concentration 73 driven at the seventh rotational speed counterclockwise rotational direction to rotate with a seventh controllable phase ($\phi\_2\_3$), and the eighth imbalance rotor 74 having eighth mass concentration 75, the eighth imbalance rotor driven at the eighth rotational speed counterclockwise rotational direction to rotate with a eighth controllable phase ($\phi\_2\_4$). The fifth imbalance rotor 68, the sixth imbalance rotor 70, the seventh imbalance rotor 72, and the eighth imbalance rotor 74 are mounted to the structure 23 at a second mounting location orientation 102 relative to the first actuator mounting location 100 wherein the fifth imbalance rotor fifth controllable phase ($\phi\_2\_1$), the sixth imbalance rotor sixth controllable phase ($\phi\_2\_2$), the seventh imbalance rotor seventh controllable phase ($\phi\_2\_3$), and the eighth imbalance rotor eight controllable phase ($\phi\_2\_4$) are independently controlled relative to the rotating frequency reference signal from sensor 32 to produce second biaxial force 43' and second moment 43" which reduces the vibration signals outputted from the vibration sensors 34. Preferably the system includes a ninth imbalance rotor having a ninth mass concentration, the ninth imbalance rotor driven to rotate with a ninth controllable phase ($\phi\_3\_1$), a tenth imbalance rotor having a tenth mass concentration, the tenth imbalance rotor driven to rotate with a tenth controllable phase ($\phi\_3\_2$), a eleventh imbalance rotor having a eleventh mass concentration, the eleventh imbalance rotor driven to rotate with a eleventh controllable phase ($\phi\_3\_3$), and a twelfth imbalance rotor having a twelfth mass concentration, the twelfth imbalance rotor driven to rotate with a twelfth controllable phase ($\phi\_3\_4$), wherein the ninth controllable rotation phase, the tenth controllable rotation phase, the eleventh controllable rotation phase, and the twelfth controllable rotation phase are controlled to produce a third biaxial force and moment which reduces the vehicle vibration monitored by the vibration sensors 34. Preferably in addition to the third vibration control actuator, the system includes a fourth vibration control actuator to produce a fourth biaxial force and moment. Preferably the first actuator rotors produce the first biaxial force 41' with a planar elliptical profile 41, with the first force elliptical profile oriented in a different plane relative to the second actuator second biaxial force 43' planar elliptical profile 43 to produce biaxial forces in the vehicle structure three dimension vehicle space.

Preferably the invention includes a rotating machinery vibration control system 30 for controlling a rotating machinery vibration in a machine having a rotating member rotating with an operational rotating frequency 26. Preferably the vibration control system 30 includes the first imbalance rotor 60 with first mass concentration 61, the second imbalance rotor 62 with second mass concentration 63, the third imbalance rotor 64 with the third mass concentration 65, and the fourth imbalance rotor 66 with the fourth mass concentration 67. Preferably the vibration control system 30 includes the plurality of vibration sensors 34 for monitoring the vibration and outputting vibration signals. Preferably the vibration control system 30 includes the system phase controller 36, the controller 36 receiving a persistent operational rotating frequency reference signal indicative of the rotating member operational rotating frequency from sensor 32, the controller also receiving the vibration sensor signals from sensor 34 wherein the controller independently controls the first imbalance rotor first controllable phase, the second imbalance rotor second controllable phase, the third imbalance rotor third controllable phase, and the fourth imbalance rotor fourth controllable phase relative to the rotating frequency reference signal to produce biaxial force 41' which reduces the vibration signals outputted from the vibration sensors 34. The produced biaxial force 41' and moment combine with the persistent rotating machinery vibration in the vehicle structure and are sensed by at least one of the sensors 34. Preferably the produced biaxial force has a planar elliptical profile, and preferably the system includes multiple vibration control actuators preferably producing multiple biaxial forces in the machinery.

Preferably the invention includes a rotary wing rotating machinery aircraft, having an aircraft body interior cabin space 22 supported in flight by a rotary wing system 24 rotating with an operational rotating frequency 26, the rotary wing aircraft 20 having a persistent operational rotating frequency vibration (the persistent vibration that correlates with the vehicular operating frequency or harmonic thereof, N/rev). The rotary wing aircraft includes an aircraft body structure 23 between the body interior cabin space 22 and the rotary wing system 24 rotating with the operational rotating frequency. The rotary wing aircraft rotating machinery vibration control system 30 includes a system controller 36, the controller 36 receiving an outputted rotating frequency signal from the operational rotating frequency reference sensor 32, and the controller 36 also receiving a plurality of outputted vibration sensor signals from the sensors 34. The rotary wing aircraft rotating machinery vibration control system 30 includes at least a first vibration control system actuator 40 and at least a second vibration control system actuator 42. Preferably the rotary wing aircraft rotating machinery vibration control system 30 includes at least a third vibration control system actuator and at least a fourth vibration control system actuator. The first vibration control system actuator 40 is mounted to the aircraft body structure 23 at a first vibration control system actuator mounting location 100, and the second vibration control system actuator 42 is mounted to the upper aircraft body structure at a second vibration control system actuator mounting location 102, the second vibration control system actuator mounting location 102 distal from the first vibration control system actuator mounting location 100. Preferably the third vibration control system actuator mounted to the upper aircraft body structure at a third vibration control system actuator mounting location 104, the third vibration control system actuator mounting location distal from the first vibration control system actuator mounting location 100 and the second vibration control system actuator mounting location 102, and the fourth vibration control system actuator mounted to the upper aircraft body structure at a fourth vibration control system actuator mounting location 106, the fourth vibration control system actuator mounting location 106 distal from the first vibration control system actuator mounting location, the second vibration control system actuator mounting location, and the third vibration control system actuator mounting location. Preferably the controller 36 independently controls the at least first vibration control system actuator 40 and the at least second vibration control system actuator 42, relative to the rotating frequency reference signal outputted by the reference sensor 32 to produce a first biaxial force and a first moment which reduce the received outputted vibration sensor signals from sensors 34. Preferably the controller independently controls the at least first vibration control system actuator, the at least second vibration control system actuator, the at least third vibration control system actuator, and the at least fourth vibration control system actuator relative to the rotating frequency reference signal outputted by the reference sensor to produce their actuator biaxial forces which reduce the received outputted vibration sensor signals from sensors 34.

It will be apparent to those skilled in the art that various modifications and variations can be made to the present invention without departing from the spirit and scope of the invention. Thus, it is intended that the invention cover the modifications and variations of this invention provided they come within the scope of the appended claims and their equivalents. It is intended that the scope of differing terms or phrases in the claims may be fulfilled by the same or different structure(s) or step(s).

The invention claimed is:

1. A rotary wing aircraft, having an aircraft body interior cabin space supported in flight through an exterior air space by a rotary wing system rotating with an operational rotating frequency, said rotary wing aircraft having a persistent operational rotating frequency vibration, said rotary wing aircraft including:
    an operational rotating frequency reference sensor, said operational rotating frequency reference sensor outputting a rotating frequency signal indicative of the rotary wing system operational rotating frequency,
    a first imbalance rotor having a first mass concentration, said first imbalance rotor driven to rotate with a first controllable phase ($\phi\_1\_1$),
    a second imbalance rotor having a second mass concentration, said second imbalance rotor driven to rotate with a second controllable phase ($\phi\_1\_2$),
    a third imbalance rotor having a third mass concentration, said third imbalance rotor driven to rotate with a third controllable phase ($\phi\_1\_3$),
    a fourth imbalance rotor having a fourth mass concentration, said fourth imbalance rotor driven to rotate with a fourth controllable phase ($\phi\_1\_4$),
    a plurality of vibration sensors for monitoring said vibration and outputting vibration signals,
    a system controller, said system controller receiving said outputted rotating frequency signal, said system controller also receiving said vibration sensor signals wherein said system controller independently and automatically controls each of said first imbalance rotor first controllable phase ($\phi\_1\_1$), said second imbalance rotor second controllable phase ($\phi\_1\_2$), said third imbalance rotor third controllable phase ($\phi\_1\_3$), and said fourth imbalance rotor fourth controllable phase ($\phi\_1\_4$), relative to said rotating frequency reference signal with said first phase ($\phi\_1\_1$), said second phase ($\phi\_1\_2$), said third phase ($\phi\_1\_3$), and said fourth phase($\phi\_1\_4$) not in a fixed phase relationship to produce a first biaxial force and a moment which reduces the vibration signals outputted from said vibration sensors.

2. A rotary wing aircraft as claimed in claim 1, having an aircraft body structure between said body interior cabin space, said exterior space and said rotary wing system rotating with said operational rotating frequency, said first imbalance rotor, and said second imbalance rotor mounted to said aircraft body structure as a first co-rotating coaxial pair with said first imbalance rotor electromagnetically motor driven at a first rotational clockwise rotational direction to rotate with the first controllable phase ($\phi\_1\_1$) and said second imbalance rotor electromagnetically motor driven at a second rotational clockwise rotational direction to rotate with the second controllable phase ($\phi\_1\_2$), said third imbalance rotor, and said fourth imbalance rotor are mounted to said aircraft body structure as a second co-rotating coaxial pair with said third imbalance rotor electromagnetically motor driven at a third rotational counter clockwise rotational direction to rotate with the third controllable phase ($\phi\_1\_3$) and said fourth imbalance rotor electromagnetically motor driven at a fourth rotational counter clockwise rotational direction to rotate with the fourth controllable phase ($\phi\_1\_4$), wherein said first biaxial force and said moment are inputted into said rotary wing aircraft through said aircraft body structure.

3. A rotary wing aircraft as claimed in claim 2, including a fifth imbalance rotor having a fifth mass concentration,
a sixth imbalance rotor having a sixth mass concentration, said fifth imbalance rotor and said sixth imbalance rotor mounted to said aircraft body structure as a third co-rotating coaxial pair, said fifth imbalance rotor electromagnetically motor driven at a fifth rotational clockwise rotational direction to rotate with a fifth controllable phase ($\phi\_2\_1$) and said sixth imbalance rotor electromagnetically motor driven at a sixth rotational clockwise rotational direction to rotate with the sixth controllable phase ($\phi\_2\_2$),
a seventh imbalance rotor having a seventh mass concentration,
an eighth imbalance rotor having a eighth mass concentration, said seventh imbalance rotor and said eighth imbalance rotor mounted to said aircraft body structure as a fourth co-rotating coaxial pair with said seventh imbalance rotor electromagnetically motor driven at a seventh rotational counter clockwise rotational direction to rotate with the seventh controllable phase ($\phi\_2\_3$) and said eighth imbalance rotor electromagnetically motor driven at a eighth rotational counter clockwise rotational direction to rotate with the eighth controllable phase ($\phi\_2\_4$),
wherein said fifth imbalance rotor, said sixth imbalance rotor, said seventh imbalance rotor, and said eighth imbalance rotor are mounted to said aircraft body structure at a second location and orientation relative to said mounted first imbalance rotor, said mounted second imbalance rotor, said mounted third imbalance rotor, and said mounted fourth imbalance rotor,
wherein said fifth imbalance rotor fifth controllable phase ($\phi\_2\_1$), said sixth imbalance rotor sixth controllable phase ($\phi\_2\_2$), said seventh imbalance rotor seventh controllable phase($\phi\_2\_3$), and said eighth imbalance rotor eight controllable phase ($\phi\_2\_4$) are independently controlled relative to said rotating frequency reference signal in a non-fixed phase relationship to one another to produce a second biaxial force at a distal second vibration control system actuator mounting location which reduces the vibration signals outputted from said vibration sensors.

4. A rotary wing aircraft, having an aircraft body interior cabin space supported in flight through an exterior air space by a rotary wing system rotating with an operational rotating frequency, said rotary wing aircraft having a persistent operational rotating frequency vibration, said rotary wing aircraft including:
an operational rotating frequency reference sensor, said operational rotating frequency reference sensor outputting a rotating frequency signal indicative of the rotary wing system operational rotating frequency;
a first imbalance rotor having a first mass concentration, said first imbalance rotor driven to rotate with a first controllable phase ($\phi\_1\_1$);
a second imbalance rotor having a second mass concentration, said second imbalance rotor driven to rotate with a second controllable phase ($\phi\_1\_2$);
a third imbalance rotor having a third mass concentration, said third imbalance rotor driven to rotate with a third controllable phase ($\phi\_1\_3$);
a fourth imbalance rotor having a fourth mass concentration, said fourth imbalance rotor driven to rotate with a fourth controllable phase ($\phi\_1\_4$);
a plurality of vibration sensors for monitoring said vibration and outputting vibration signals, said vibration sensors being accelerometers; and
a system controller, said system controller receiving said outputted rotating frequency signal, said system controller also receiving said vibration sensor signals wherein said system controller independently controls said first imbalance rotor first controllable phase ($\phi\_1\_1$), said second imbalance rotor second controllable phase ($\phi\_1\_2$), said third imbalance rotor third controllable phase ($\phi\_1\_3$), and said fourth imbalance rotor fourth controllable phase ($\phi\_1\_4$), relative to said rotating frequency reference signal with said first phase ($\phi\_1\_1$), said second phase ($\phi\_1\_2$), said third phase ($\phi\_1\_3$), and said fourth phase($\phi\_1\_4$) not in a fixed phase relationship to produce a first biaxial force and a moment which reduces the vibration signals outputted from said vibration sensors.

5. A rotary wing aircraft vibration control system comprising:
a rotary wing aircraft having an aircraft body interior cabin space supported by a rotary wing system rotating with an operational rotating frequency;
a persistent operational rotating frequency vibration associated with the rotary wing aircraft;
an operational rotating frequency reference sensor, the operational rotating frequency reference sensor producing a rotating frequency signal indicative of the operational rotating frequency;
a first imbalance rotor having a first mass concentration and, the first imbalance rotor driven to rotate with a first controllable phase ($\phi\_1\_1$);
a second imbalance rotor having a second mass concentration, the second imbalance rotor driven to rotate with a second controllable phase ($\phi\_1\_2$);
a third imbalance rotor having a third mass concentration, the third imbalance rotor driven to rotate with a third controllable phase ($\phi\_1\_3$);

a fourth imbalance rotor having a fourth mass concentration, the fourth imbalance rotor driven to rotate with a fourth controllable phase ($\phi\_1\_4$);

a plurality of vibration sensors for monitoring the operational rotating frequency vibration and producing vibration signals, said vibration sensors being accelerometers, a system controller receiving the rotating frequency signal, the system controller also receiving the vibration signals; and wherein said system controller independently and separately controls each of the first imbalance rotor first controllable phase ($\phi\_1\_1$), the second imbalance rotor second controllable phase ($\phi\_1\_2$), the third imbalance rotor third controllable phase ($\phi\_1\_3$), and the fourth imbalance rotor fourth controllable phase ($\phi\_1\_4$), wherein the control is relative to the rotating frequency signal with the first phase ($\phi\_1\_1$), the second phase ($\phi\_1\_2$), the third phase ($\phi\_1\_3$), and the fourth phase ($\phi\_1\_4$) not being in a fixed phase relationship relative to each other, thereby producing a first biaxial force and a moment, and reducing the vibration signals from the vibration sensors.

\* \* \* \* \*